(12) United States Patent
Myers

(10) Patent No.: US 10,976,051 B2
(45) Date of Patent: Apr. 13, 2021

(54) MITIGATING EFFECT OF ELECTRICAL NOISE SYSTEM AND METHOD

(71) Applicant: Channel Products, Inc., Solon, OH (US)

(72) Inventor: Jim Myers, Mentor, OH (US)

(73) Assignee: Channel Products, Inc., Solon, OH (US)

(*) Notice: Subject to any disclaimer, the term of this patent is extended or adjusted under 35 U.S.C. 154(b) by 587 days.

(21) Appl. No.: 15/790,947

(22) Filed: Oct. 23, 2017

(65) Prior Publication Data

US 2018/0135856 A1 May 17, 2018

Related U.S. Application Data

(60) Provisional application No. 62/411,119, filed on Oct. 21, 2016.

(51) Int. Cl.
*F23Q 3/00* (2006.01)
*G05B 19/042* (2006.01)
*F23N 5/24* (2006.01)

(52) U.S. Cl.
CPC .............. *F23Q 3/006* (2013.01); *F23N 5/242* (2013.01); *G05B 19/0428* (2013.01)

(58) Field of Classification Search
CPC .................................. F23Q 3/006; F23N 5/242
USPC ......................................................... 361/247
See application file for complete search history.

(56) References Cited

U.S. PATENT DOCUMENTS

| 4,282,574 A | * | 8/1981 | Yoshida | F02D 41/263 123/491 |
| 4,642,753 A | * | 2/1987 | Easthill | G05B 19/0428 700/79 |
| 6,396,032 B1 | * | 5/2002 | Denny | F23N 5/242 219/501 |
| 2013/0009472 A1 | * | 1/2013 | Orth | G05B 19/042 307/43 |
| 2015/0278001 A1 | * | 10/2015 | Tohyama | G06F 11/0739 714/37 |

* cited by examiner

*Primary Examiner* — Kevin J Comber
(74) *Attorney, Agent, or Firm* — Tucker Ellis LLP; Michael G. Craig; Heather M. Barnes

(57) ABSTRACT

One or more techniques and/or systems are disclosed for mitigating the effect of electrical noise on electrical-based hardware components. Electrical noise can be generated by an igniter adjacent to one or more of the components. In lieu of, or in addition to, shielding, hardening, and other noise prevention techniques, methods and systems can be used to mask the effects of electrical noise upon other hardware components. State data for a target component can be stored in volatile memory. Upon a reset of microprocessor controlling the component, the stored state data can be read and matched with known state data stored in non-volatile memory. After the reset, the target component can be placed in the state that matches the state data indicated by the stored data.

16 Claims, 17 Drawing Sheets

MITIGATING EFFECT OF ELECTRICAL NOISE SYSTEM AND METHOD

CROSS-REFERENCE TO RELATED APPLICATIONS

This application claims priority to U.S. Provisional Patent Application Ser. No. 62/411,119, entitled MITIGATING EFFECT OF ELECTRICAL NOISE SYSTEM AND METHOD, filed Oct. 21, 2016, which are incorporated herein by reference.

BACKGROUND

Electrical noise can result from a variety of sources and can include radiated and conducted noise. Radiated noise is propagated through the air, while conducted noise is present on power and signal lines. Sources may include motors, short-circuited wiring, and sparking across a gap, amongst others things. Igniter systems typically found in gas ignition devices and appliances can be a source of an electrical spark across a gap, which may result in electrical noise. Electrical noise can cause corruption of desired signals being transmitted by equipment connected and/or disruption of circuitry operations. In extreme cases, these types of noise currents may even become great enough to cause electrical damage.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, to enhance apparent asynchronous noise immunity of a power pack control module used in an appliance, a firmware technique may be applied to utilize characteristics of volatile memory, such as disposed on a microcontroller in the system. In combination with electrical properties of a microcontroller, this technique may be used to mask random component state changes which may be induced by electrical noise (e.g., produced by a proximate spark ignition).

In one implementation, a method for mitigating the effect of electrical noise on a hardware component can comprise storing state data indicative of a current state of a first component subject to electrical noise in volatile memory upon a state change of the first component. Further, the example method can comprise reading the stored state data of the first component from the volatile memory upon reset of a microprocessor controlling at least a portion of the operation of the first component, where the reset can be a result of electrical noise. Additionally, the example method can comprise placing the first component in a component state matching the state indicated by the state data read from the volatile memory.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
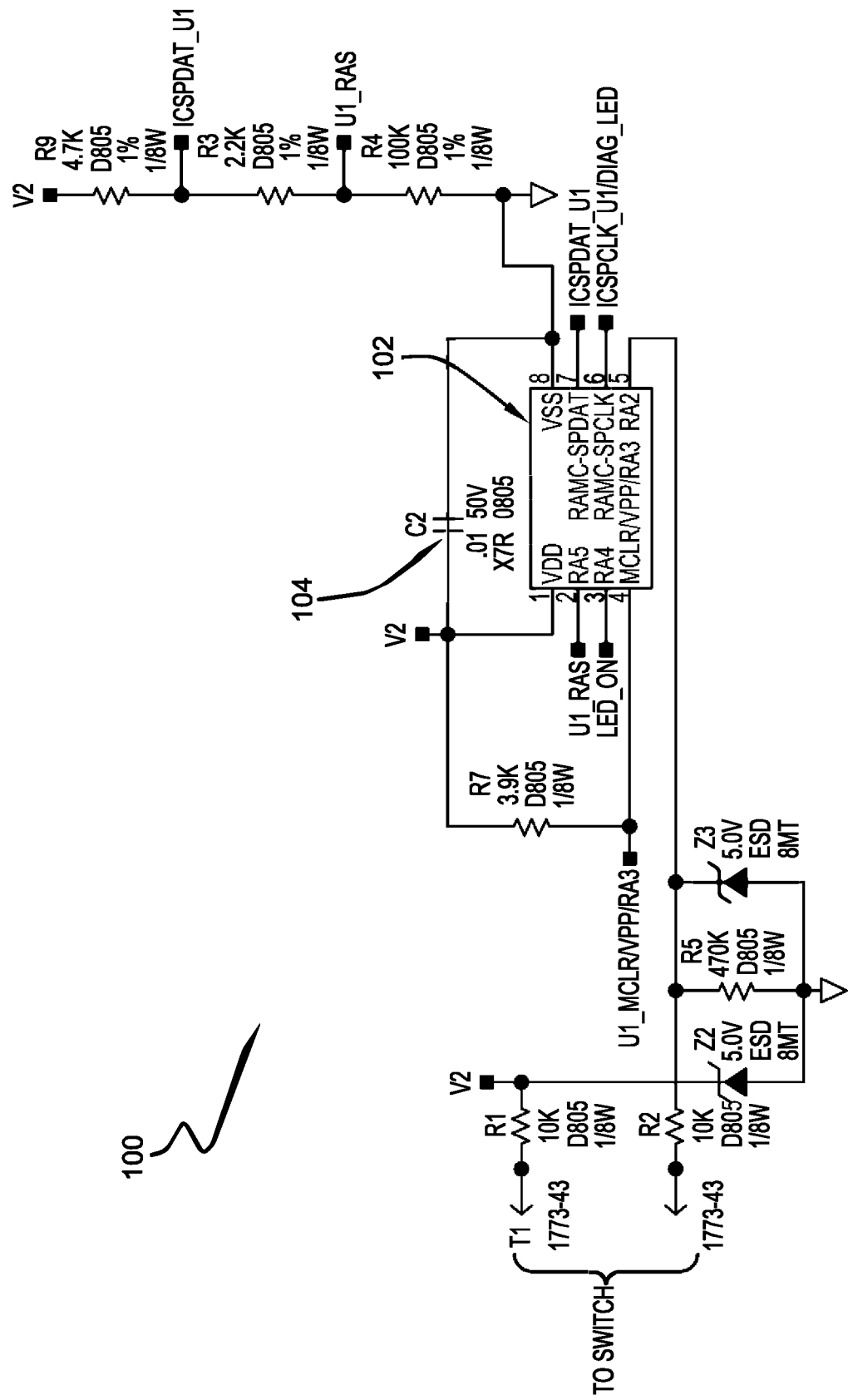
FIG. 1 is a schematic diagram illustrating an example implementation of at least a portion of an exemplary system for mitigating the effect of electrical noise in a device.
Figure 2:
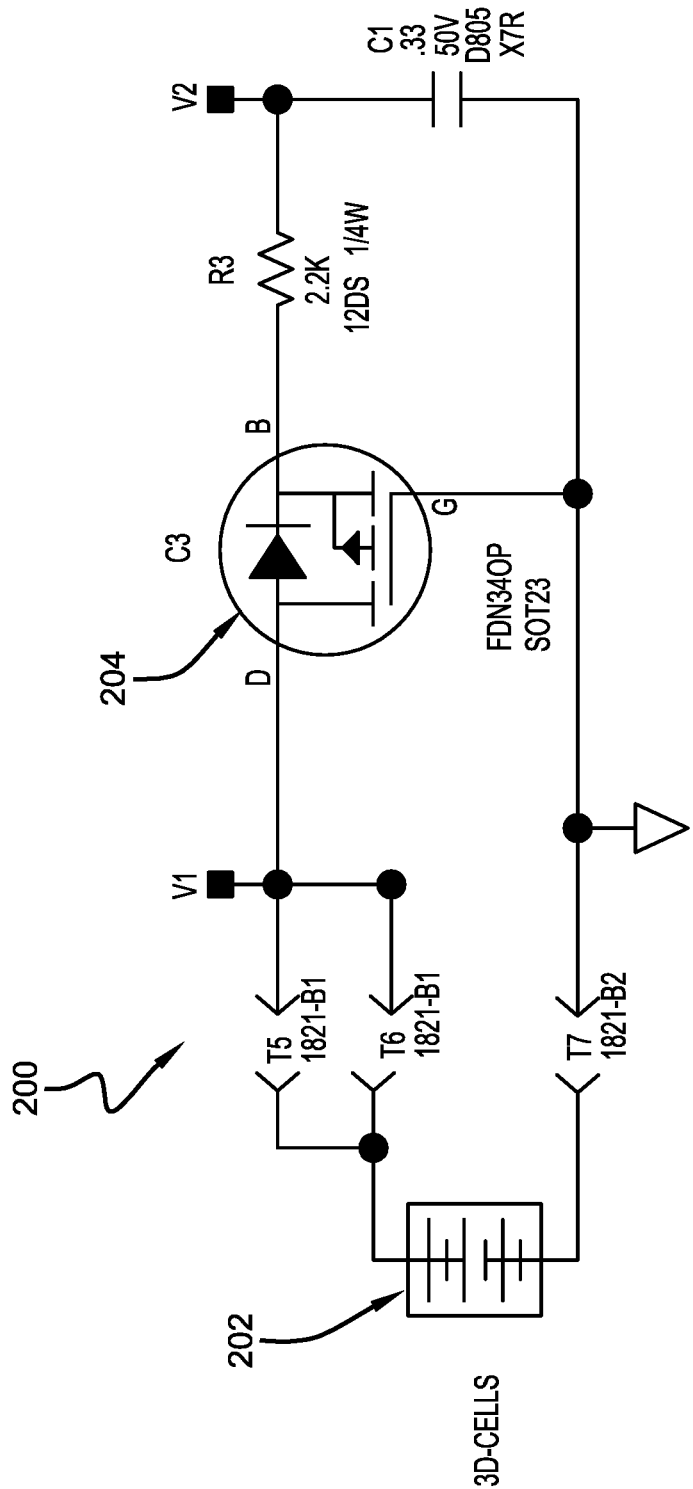
FIG. 2 is a schematic diagram illustrating an example implementation of at least a portion of an exemplary system for mitigating the effect of electrical noise in a device.
Figure 3:
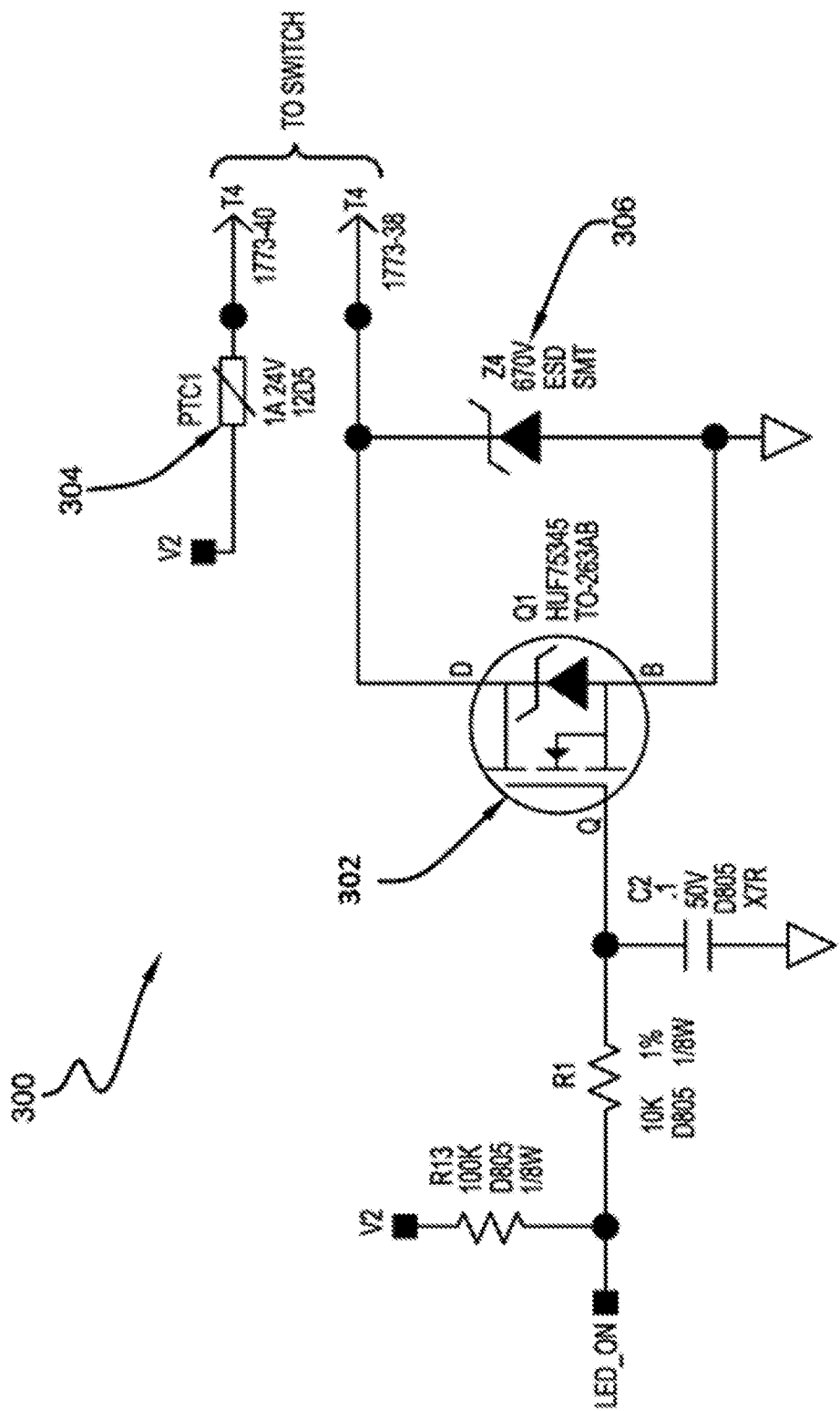
FIG. 3 is a schematic diagram illustrating an example implementation of at least a portion of an exemplary system for mitigating the effect of electrical noise in a device.
Figure 4:
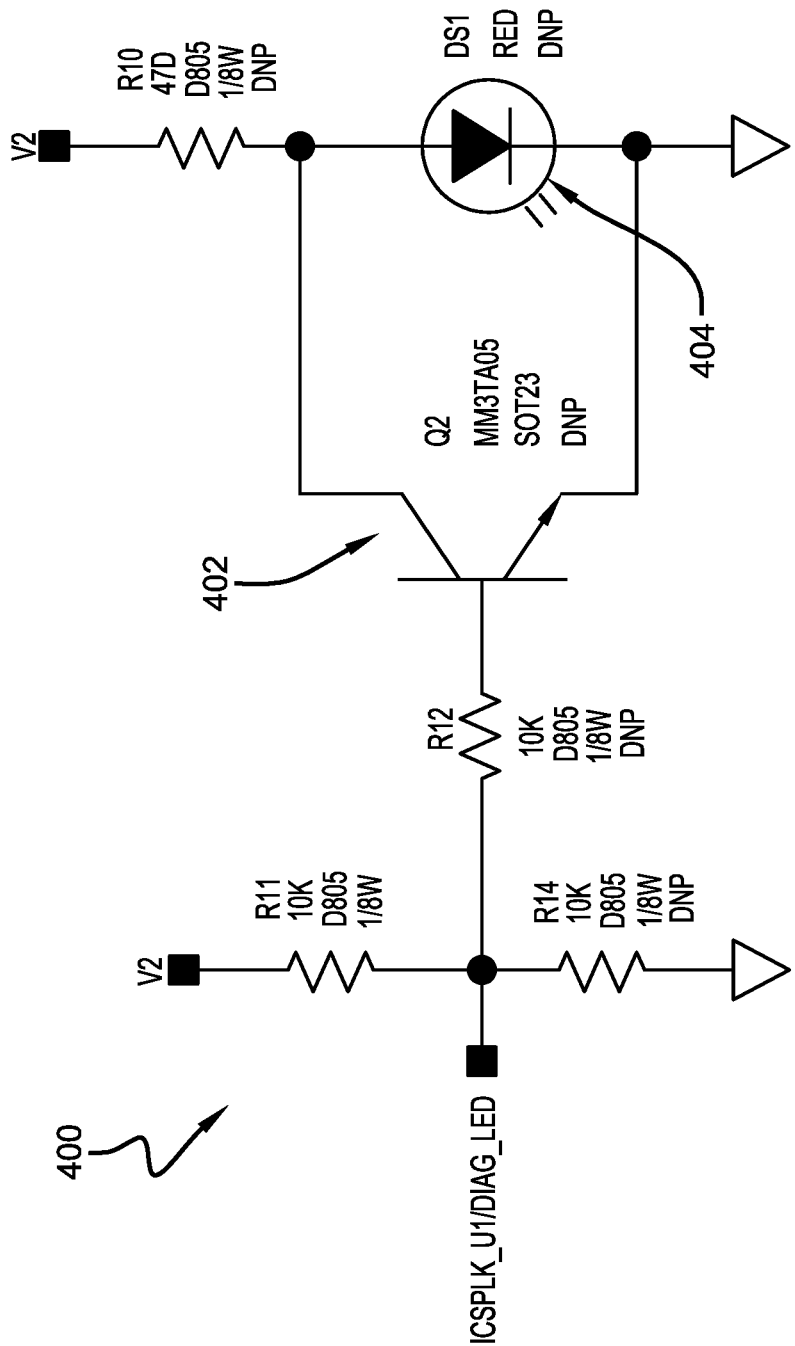
FIG. 4 is a schematic diagram illustrating an example implementation of at least a portion of an exemplary system for mitigating the effect of electrical noise in a device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A method may be devised that mitigates the effect electrical noise can have on certain hardware components. For example, certain types of electrical noise can be generated by a plasma arc created between an electrical gap, such as an air gap between two conductors in an electrical circuit. In one example, asynchronous electrical noise created by an electrical gap can be propagated across a system by radiated noise (e.g., as an electromagnetic field). The propagated electrical noise can impact other, proximate electrical components, such that desired operation of those components is affected. Typically, engineers and designers of electrical systems utilize shielding and/or hardening of electrical systems, and system components, in an attempt to mitigate the effect of electrical noise. In lieu of, or in addition to, shielding, hardening, and other noise prevention techniques, the methods described herein can be used to mitigate or mask the effects of electrical noise upon other hardware components.

In one aspect, the electrical characteristics of a microcontroller and associated volatile memory (e.g., random access memory (RAM)), along with appropriate programming, may be used to mask or mitigate the impact of electrical noise on an electrical component. In one implementation, electrical noise impacting, or received by, a microcontroller can result in a microcontroller reset, which may also reset the state of components coupled to the microcontroller. As one example, a lighting system (e.g., disposed on an appliance, a grill, or outdoor fire feature) may be, at least partially, controlled by a microcontroller. In this example, when the microcontroller is reset by electrical noise, the state of the lighting system may also be reset. That is, for example, if the lighting system was disposed in a powered-on state prior to the reset, the lighting system may be shut down to a powered-off (e.g., unpowered) state after the reset. These types of conditions resulting from the effects of the electrical noise are typically undesirable during normal operation.

In one implementation, in this aspect, when a microcontroller is occasionally reset due to electrical noise, one or more techniques described herein, can utilize the firmware and volatile memory to mitigate the effects of a microcontroller reset on a system, and system components. For example, volatile memory has electrical characteristics that allow it to remain in a substantially non-degraded state, at least until a supplied voltage level to the memory reaches a low-power level (e.g., a voltage threshold for memory data storage). In one implementation, the reset that effects the circuit or microcontroller can be separate event from power fluctuations that may affect the memory. That is, for example, data stored in the memory may be intact after recovery from a microcontroller reset event.

In one implementation, data indicative of the state of one or more of a system's component is stored in memory, for example, indicating the last known state (e.g., current state) of the component(s). In this implementation, after a reset event, the stored state data can be read and checked against known values for the state data, using firmware checks. In this implementation, a microcontroller's configuration and/or firmware can be adjusted to recover as soon as possible upon a reset event, and the state data can be read from memory, where the state data is indicative of the last known state of a target component, for example. As an example, if the last known component state was indicated to be "on" (e.g., powered), the microcontroller can set (e.g., switch) the component output to the "on" (e.g., powered) state. Inversely, if the memory contained values indicates an "off" (e.g., unpowered or non-powered) state, then the component may remain in (e.g., or default to) the "off" (e.g., unpowered, or non-powered) state, for example.

In this implementation, for example, due to the short amount of time (e.g., approximately a couple hundred microseconds) in which the entire reset and recovery of firmware, and setting the proper component state, occurs, human physiology can play a role in the resulting perception of the mitigating effect. That is, for example, humans may not be able to perceive (e.g., or barely perceive) that the component output state was ever changed, such as between the microcontroller reset and resulting resetting of the component state. Further, in one implementation, if power is removed from the system for a pre-determined time (e.g., more than a minute or more than a minute and a half), data stored in the volatile memory can degrade. In this example, upon restoration of the power (e.g., batteries) to the system (e.g., and memory), the component module can default to a default (e.g., unpowered) state. In one implementation, the time for the memory to degrade may be adjusted to be increased, using circuit components.

In one implementation, an exemplary method can be devised for mitigating the effect of electrical noise on a hardware component. In this exemplary method, state data that is indicative of a current state of a first component subject to electrical noise can be stored in volatile memory upon a state change of the first component. For example, when a state change is indicated (e.g., detected by a coupled microprocessor) for the component (e.g., one or more parts of a grill or other flame-producing or heating system), the new state for the component can be stored in the volatile memory. As one example, the component may comprise a lighting system for a cooking apparatus, which can be placed in a powered (e.g., on) state or an unpowered (e.g., off) state. In this example, when the lighting system is switched from the off to the on position, a state change is indicated. This new state (e.g., on) can be stored in the volatile memory (e.g., RAM), such as indicated by one or more numbers that correspond to an on state.

Further, in this exemplary method, the stored state data of the first component can be read from the volatile memory upon a reset of a microprocessor that is controlling at least a portion of the operation of the first component. In this implementation, the reset may be a result of electrical noise affecting the microprocessor, for example, causing the microprocessor to reset. For example, upon reset of the microprocessor, the state of the first component that existed at the time of the microprocessor reset can be determined by reading the state data from the volatile memory. That is, as one example, the state data stored in memory can be read and compared with known state data to identify which of the two states the lighting system may have been in prior to reset. In one implementation, the known state data may be stored in non-volatile memory (e.g., EEPROM) and used to determine which state the target component existed prior to microprocessor reset.

Additionally, in this exemplary method, the first component can be placed in a component state that matches the state indicated by the state data read from the volatile memory. As one example, if the lighting system was in a powered state at the time of the microprocessor reset, the state data stored in the volatile memory will indicate this state, and the lighting system can be placed into the powered condition after the microprocessor reset. Alternately, for example, if the lighting system was in an un-powered state at the time of the microprocessor reset, the state data stored in the volatile memory will indicate this state, and the lighting system can be placed into the un-powered condition after the microprocessor reset.

In this way, for example, the effects of a reset of the microprocessor, resulting from electrical noise, may be mitigated to a point that is relatively unperceivable by a user of the apparatus comprising the device. That is, for example, without utilizing the described exemplary method, a microprocessor reset may cause the component (e.g., first component) to reset to a default condition (e.g., typically unpowered). In this example, a lighting system may switch from powered to unpowered, resulting in the lights to be shut off, which is undesirable. However, using the exemplary method described, the amount of time between the microprocessor reset and the placing of the component into the state stored in memory is typically imperceptible to the user. As an example, the time it takes for the microprocessor reset, reading the state data from the volatile memory, comparing with known state data, and placing the component in the stored state may be merely a few microseconds. In this example, the result may be that the user does not perceive any change in the state of the component when a microprocessor reset occurs. As such, in this example, electrical noise mitigation, and/or shielding, may not be as necessary when an apparatus utilizes the exemplary methods described herein.

Figure 11:
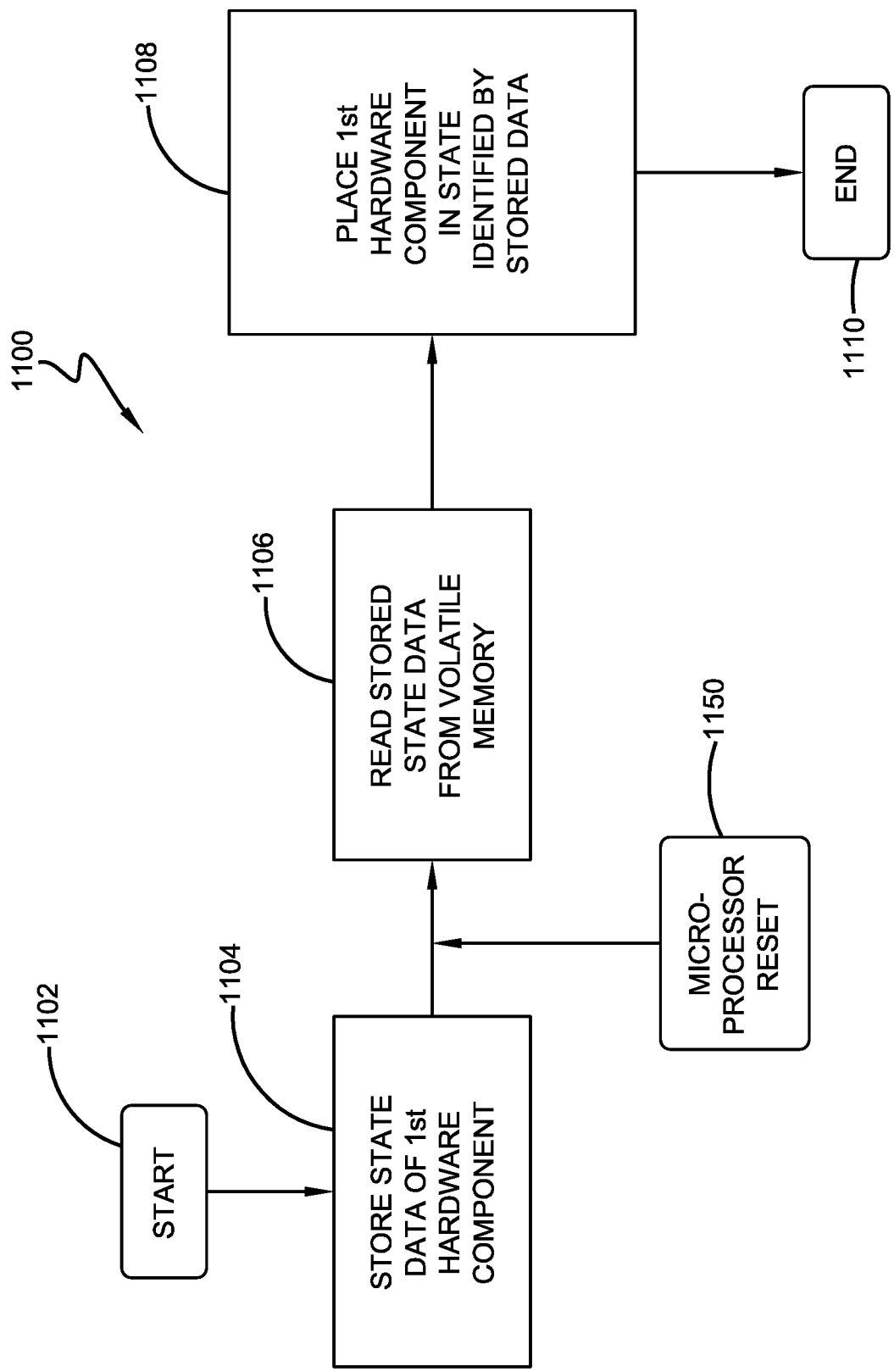
FIG. 11 is flow chart of one exemplary implementation of a device.

As an illustrative example, as illustrated in FIG. 11, an exemplary method 1100 may begin at 1002. At 1104, state data indicative of a current state of a first hardware component subject to electrical noise can be stored in volatile memory upon a state change of the first hardware component. At 1106, the stored state data of the first hardware component can be read from the volatile memory upon reset of a microprocessor, at 1150, that is controlling at least a portion of the operation of the first hardware component, where the reset is a result of electrical noise. In this example, at 1108, the first hardware component can be placed in a component state that is indicated by the state data read from the volatile memory. At 1110 the example method 1100 can end.

Figure 12:
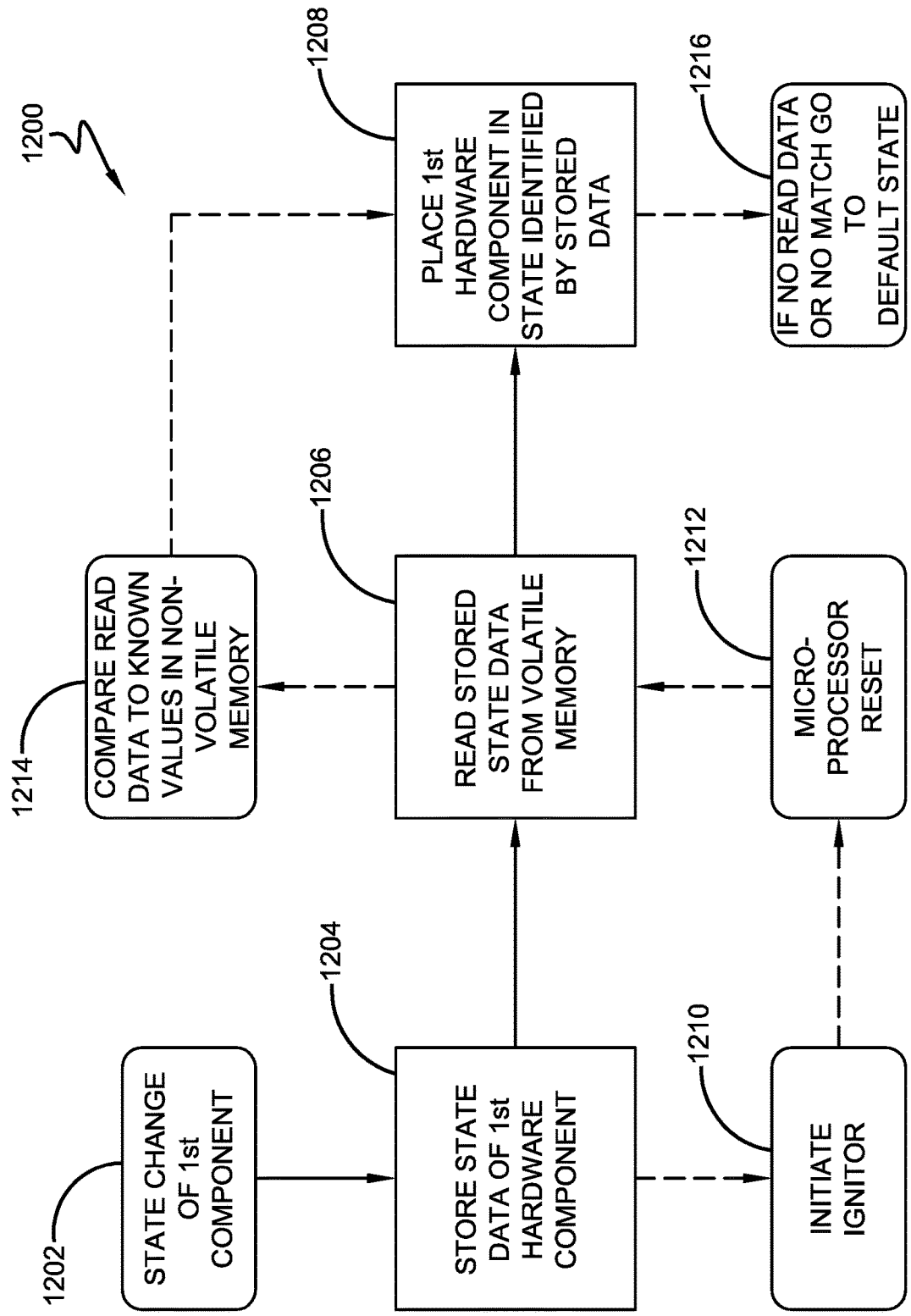
FIG. 12 is another flow chart of one exemplary implementation of a device.

Another illustrative example is illustrated in FIG. 12, showing the method 1200. In this example method 1200, a state change may occur for the $1^{st}$ hardware component. For example, the first component may comprise a lighting system, which can be changed from an unpowered to a powered state. At 1204, state data indicative of the current state of the first component (e.g., powered) can be stored in volatile memory. For example, one or more values indicative of the current state can be stored in the memory.

In this example, at 1210, an igniter may be initiated. For example, an apparatus, such as a grill, heater, or other heating/lighting component, may comprise an electrical igniter to ignite fuel to operate the apparatus. In this example, the igniter is initiated to ignite the fuel, which may result in electrical noise. At 1212, the microprocessor can be reset. For example, the electrical noise generated by the igniter may result in a reset of the microcontroller in the apparatus.

In this example method 1200, at 1206, the state data stored in volatile memory, indicative of the state of the first component prior to the microprocessor reset, can be read. As an example, the stored data may comprise one or more numbers representative of a component state. At 1214, the read data can be compared against known component state data that is stored in non-volatile memory. That is, for example, the non-volatile memory can comprise known state data values that are indicative of known states of the first component. In this example, the data read from the volatile memory can be compared with the known stored data to identify the state of the first component prior to the microprocessor reset. In this example, a plurality of values may be stored in and read from the volatile memory, in order to provide redundancy in the event of memory or data degradation.

At 1208 in the example, method 1200, the first hardware component can be placed in the state indicated by read data, as identified by the known data values. That is, for example, if the first component was in a powered state, data indicative of the powered state can be stored in the volatile memory. In this example, upon microprocessor reset (e.g., reinitiating the microprocessor after a shutdown), the state data stored in volatile memory can be immediately read (e.g., as directed by stored firmware). Further, the read data can be compared with the stored, known values to determine what state the read data is indicating. In this example, the state data indicates a powered state, and the microcontroller can place the $1^{st}$ component (e.g., lights) into a powered state. In one implementation, if no state data is identified in the volatile memory, it doesn't match any known values in the non-volatile memory, or the data is corrupted, the first component can be placed in a default state (e.g., unpowered), at 1216.

In one implementation, the first component may be disposed in an apparatus that utilizes an igniter to create a spark, for example, which may be used to ignite a fuel-air mixture. As an example, a stove, water heater, heater or grill may utilize an igniter to ignite a fuel-air mixture for heating and/or cooking. Often, spark-type igniters comprise an electrode disposed with a gap between the electrode and a conductive element. When electricity is applied to the electrode at sufficient voltage, a spark is created in the air gap between the electrode and the adjacent conductive element. Further, in this implementation, the plasma created in the air-gap produces electrical noise, which can be radiated from the igniter as electromagnetic radiation. This type of electrical noise may be sufficient to disrupt the microprocessor, resulting in a reset.

In one implementation, storing the state data that is indicative of the current state of the first component can comprise storing more than one different value into the volatile memory. In this implementation, the respective different values can be indicative of the current state of the first component. For example, a plurality of different values (e.g., normal numbers, binary indicators, etc.) can be used to indicate a same state of the component, and one or more of those different values may be stored in the volatile memory. In this implementation, this type of redundant state data storage may be beneficial in the event of data corruption or other potential data loss issues.

Further, in this implementation, reading the stored state data indicative of the state of the first component can comprise reading respective different stored values from the volatile memory. Additionally, in this implementation, firmware that is stored in non-volatile memory (e.g., EEPROM) coupled with the microprocessor can be used to check the respective read values to identify the state of the first component. That is, for example, each of the values stored in the volatile memory can be read after a microprocessor reset, and those stored values can be compared with the known values stored in the non-volatile memory to identify the state of the component at the time of the reset.

In one implementation, the one or more state data values read from the volatile memory can be compared or matched against known state data values to identify the state of the component at the time of the reset. In this implementation, if the state data values read from the volatile memory cannot be matched with known values, the state of the first component can be defaulted to an unpowered state. In one implementation, the volatile memory may degrade to a state in which the stored data is no longer available to be effectively read. As an example, this type of memory degradation may occur when electrical power to the memory drops below a power threshold level that allows data to remain in memory. In this implementation, when the volatile memory degrades, the state of the first component can be defaulted to an unpowered state.

A system may be devised that can be used to mitigate the effect that electrical noise may have on certain hardware components used in an apparatus. FIGS. 1-5 are schematic diagrams illustrating one or more portions of a system and/or device that can be used to mitigate the effect that electrical noise may have on certain hardware components used in an apparatus. FIGS. 6A-6D, and 7-9 are component diagrams illustrating one example, implementation of a system or device that may be used for mitigating the effect that electrical noise may have on certain hardware components. For example, electrical noise generated by a plasma arc created between an electrical gap can propagate to other components in the apparatus and disrupt desired operation. The propagated electrical noise can potentially disrupt operation of proximate components, such as microprocessors and other electrical components, including lighting systems, display systems, timers, processors, sensors, input devices, and more. In lieu of, or in addition to, shielding, hardening, and other noise mitigation techniques, the systems described herein can be used to mask the effects of electrical noise upon other hardware components.

In one implementation, as illustrated in FIGS. 1-5, 6A-6D, and 7-9, a system for mitigating the effect of electrical noise on a hardware component in an apparatus can comprise volatile memory 806 that is configured to store data indicative of a current state of a first component 404 that may be subject to the electrical noise. In one implementation, the volatile memory 806 can comprise some type of RAM. Further, the exemplary system can comprise a microprocessor 102, 802 that is communicatively coupled with the volatile memory 806. In this implementation, the microprocessor 102, 802 can be configured to control at least a portion of the operation of the first component 404, for example, through some type of communication or data bus or wireless interface. In one implementation, non-volatile memory 804 may be disposed on, or coupled with, the microprocessor, such as on a printed circuit board 100, 808 that comprises the microprocessor 102, 802 components and the memory 804, 806.

The microprocessor 102, 802 can be configured to store the data indicative of the current state of the first component in the volatile memory 806 upon a state change of the first component 404. For example, firmware may be resident in non-volatile memory 804 that is communicatively coupled with the microprocessor 102, 802. In this example, the firmware may comprise programming that instructs the microprocessor 102, 802 to store the component state data upon detecting a state change. Further, the microprocessor 102, 802 can be configured to read the stored state data of the first component from the volatile memory 806 upon a reset of the microprocessor 102, 802 resulting from electrical noise. For example, the firmware may instruct the microprocessor 102, 802 to read state data for the coupled component upon waking up from a microprocessor reset, such as one caused by electrical noise. Additionally, the microprocessor 102, 802 can be configured to place the first component in a component state that is indicated by the state data read from the volatile memory 806. That is, for example, the stored state data can be read from the volatile memory 806 and compared against known state data that is stored in the non-volatile memory 804. In this example, this comparison may indicate a match with the known state data, and the component can be placed into the condition matched with the known state data.

In one implementation, the data indicative of the current state of the first component in the volatile memory 806 can comprise a plurality of different values, respectively comprising an indication of the same current state of the first component. As described above, the state data for the component can comprise a plurality of values, respectively identifying a same state for the component. As an example, value ρ may represent a powered state, and value ν may represent an unpowered state. In this example, ρ may be represented in non-volatile memory 804 by a first set of numbers (e.g., or other values), and ν may be represented by a second set of numbers (e.g., or other values). In one example, upon reset of the microprocessor 102, 802, the plurality of stored values can be read from the volatile memory 806, and respectively compared with known state values (e.g., ρ, ν), from the non-volatile memory 804. In this example, if one or more of the read data values match a known state data value (e.g., ρ, ν), the component can be placed into the matching state indicated by the known value(s).

Figure 5:
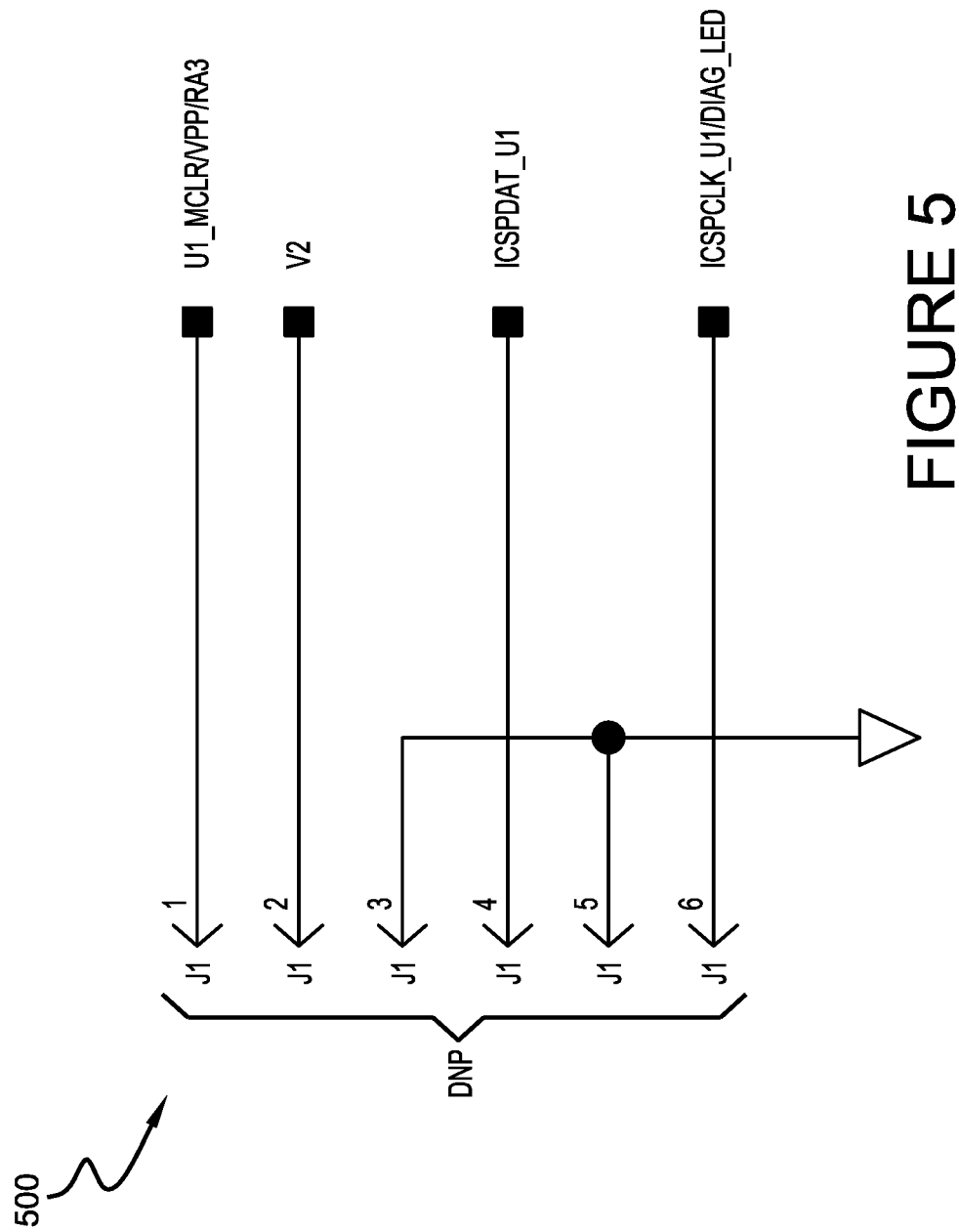
FIG. 5 is a schematic diagram illustrating an example implementation of at least a portion of an exemplary system for mitigating the effect of electrical noise in a device.
Figure 6A:
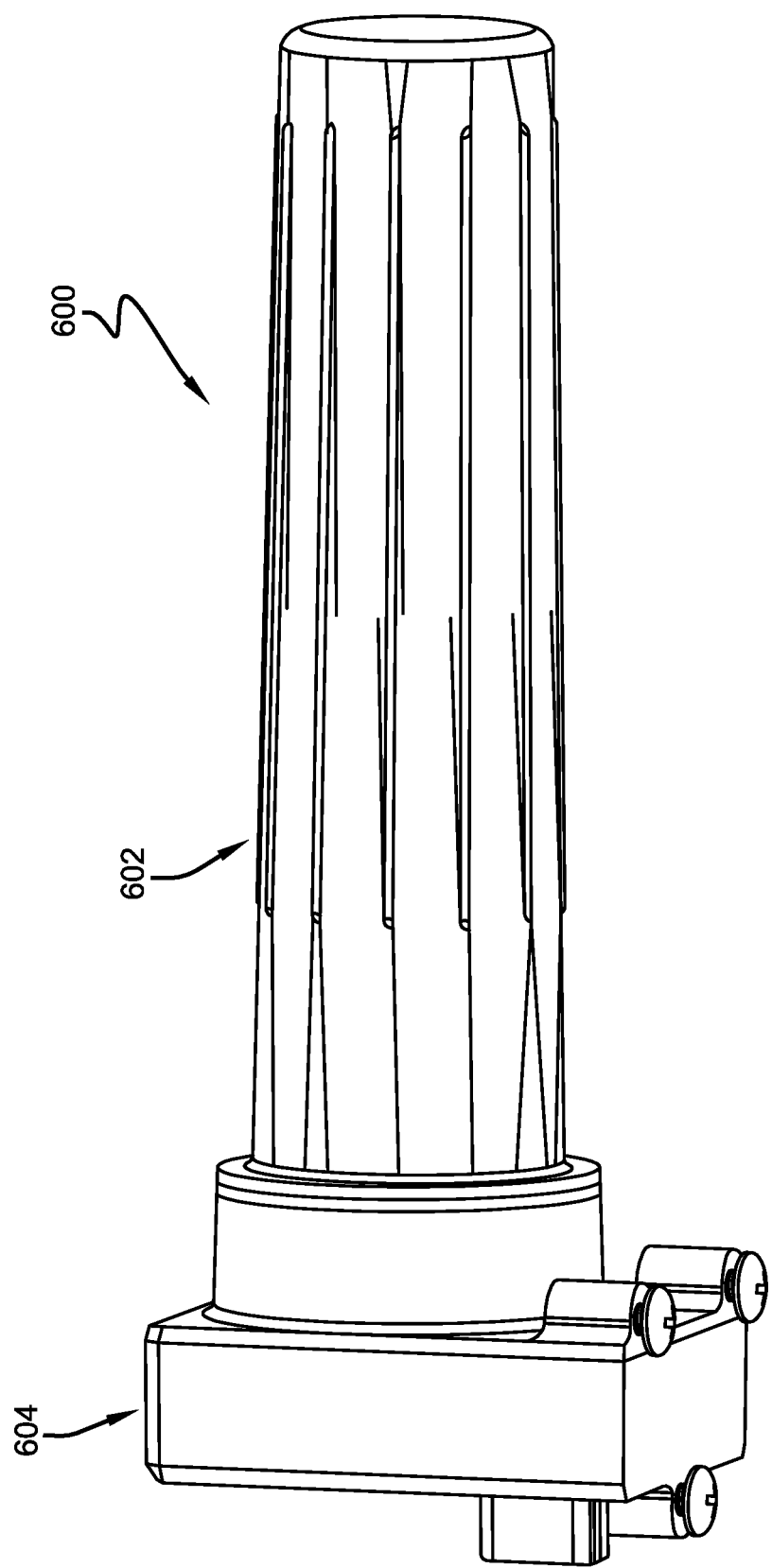
FIG. 6A is a perspective view of one aspect of an exemplary implementation of a component of a device.
Figure 6B:
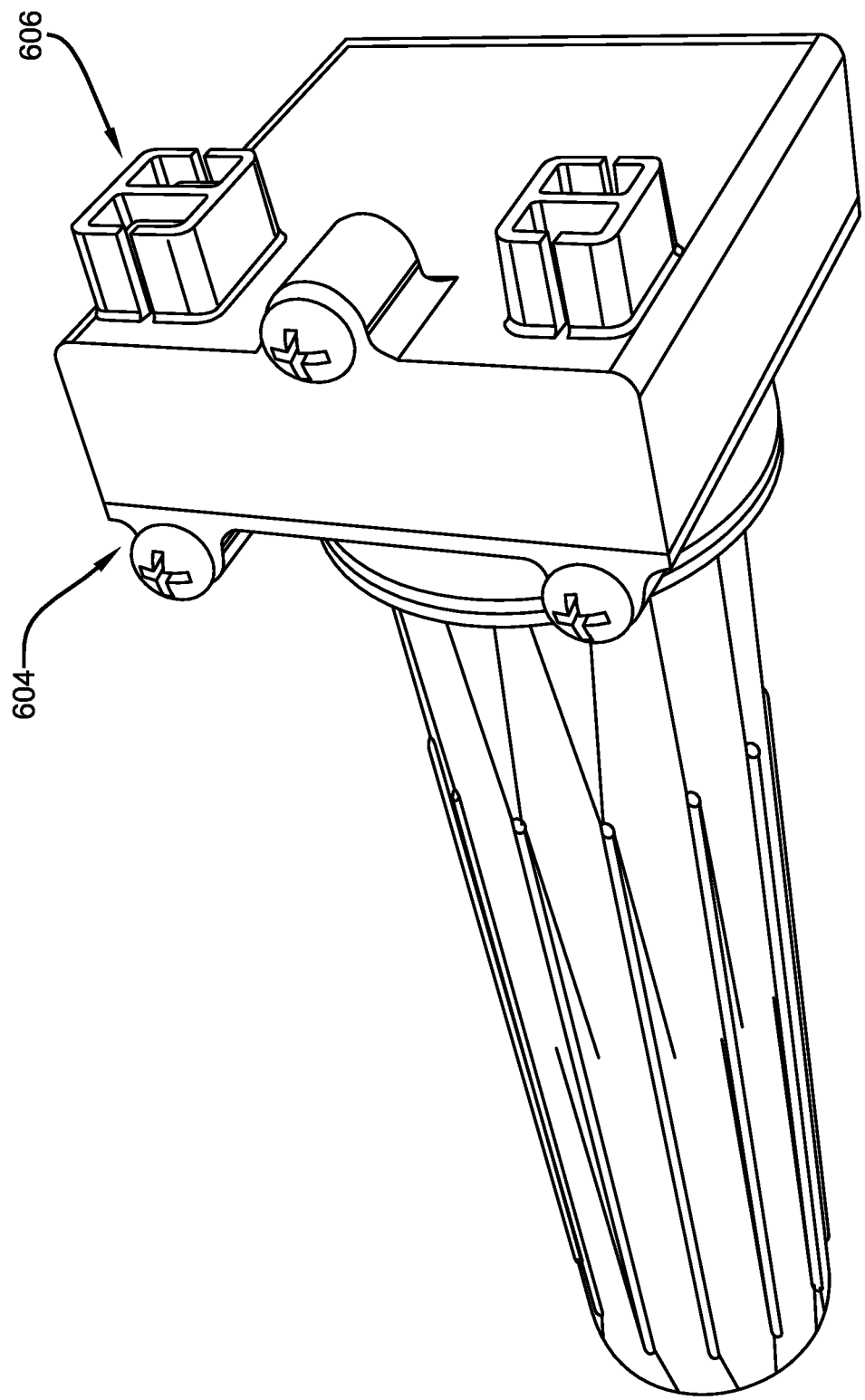
FIG. 6B is a bottom perspective view of FIG. 6A.
Figure 6C:
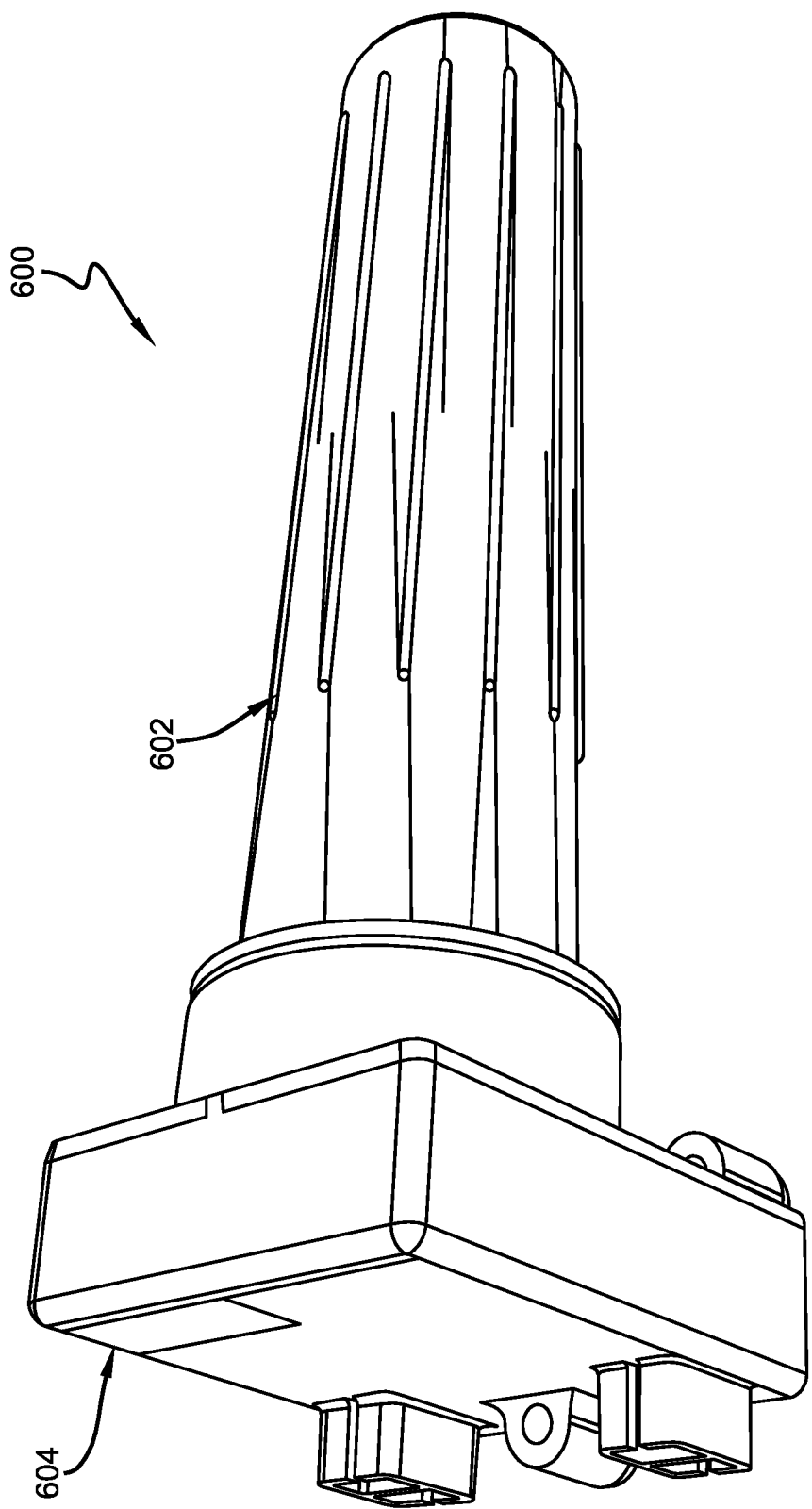
FIG. 6C is another bottom perspective view of FIG. 6A.
Figure 6D:
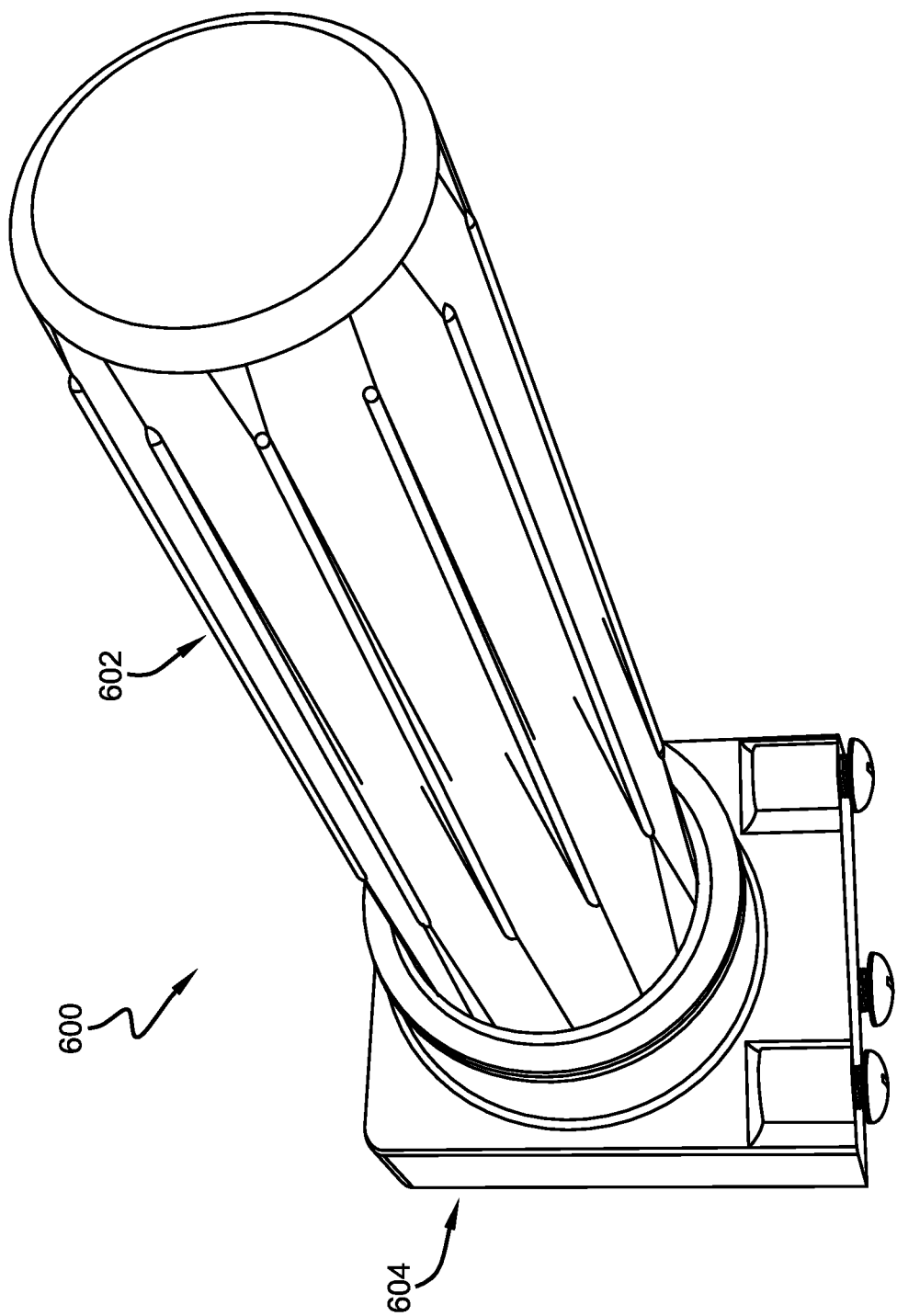
FIG. 6D is a top perspective view of FIG. 6A.
Figure 7:
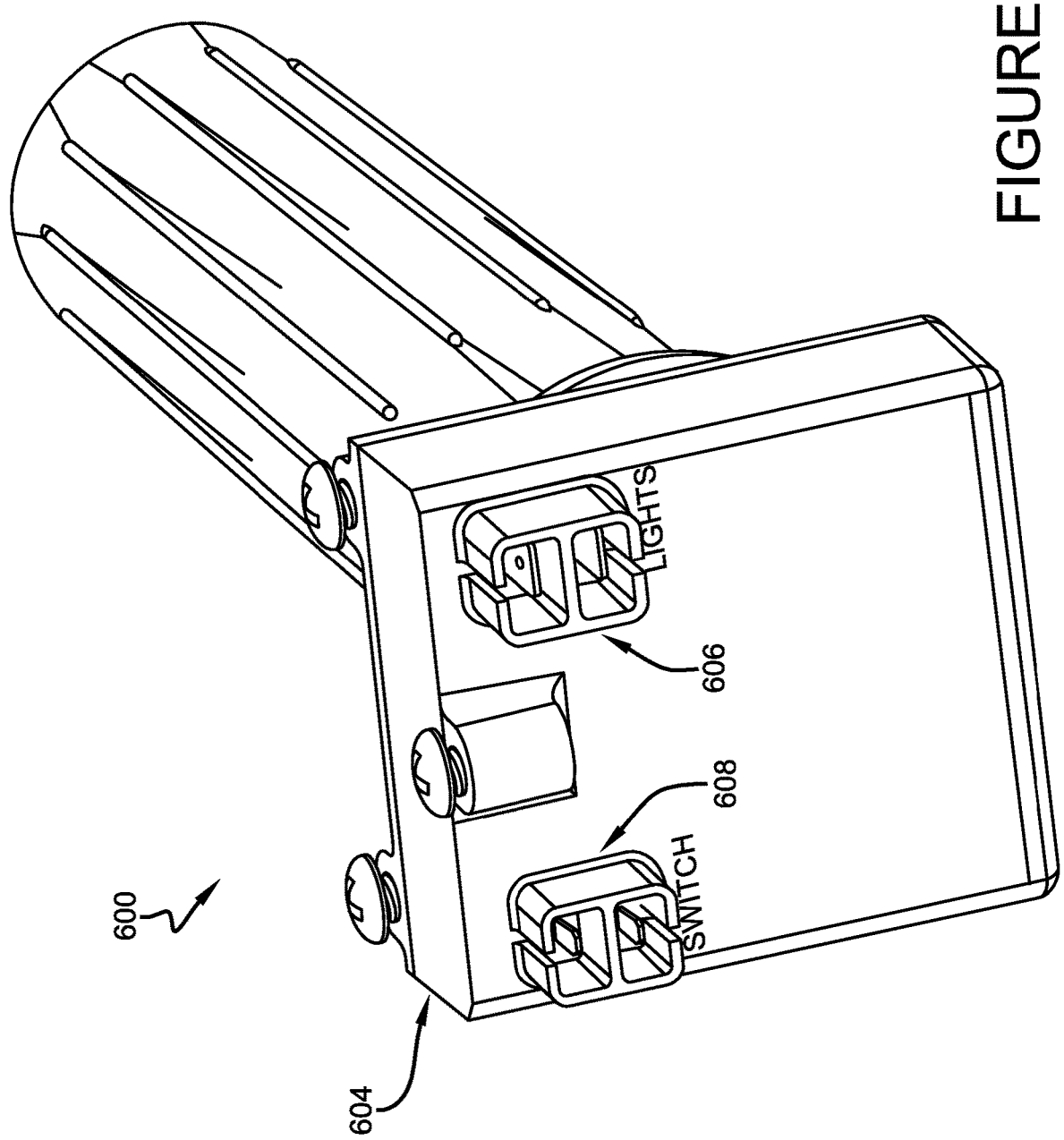
FIG. 7 is another bottom perspective view of FIG. 6A.
Figure 8:
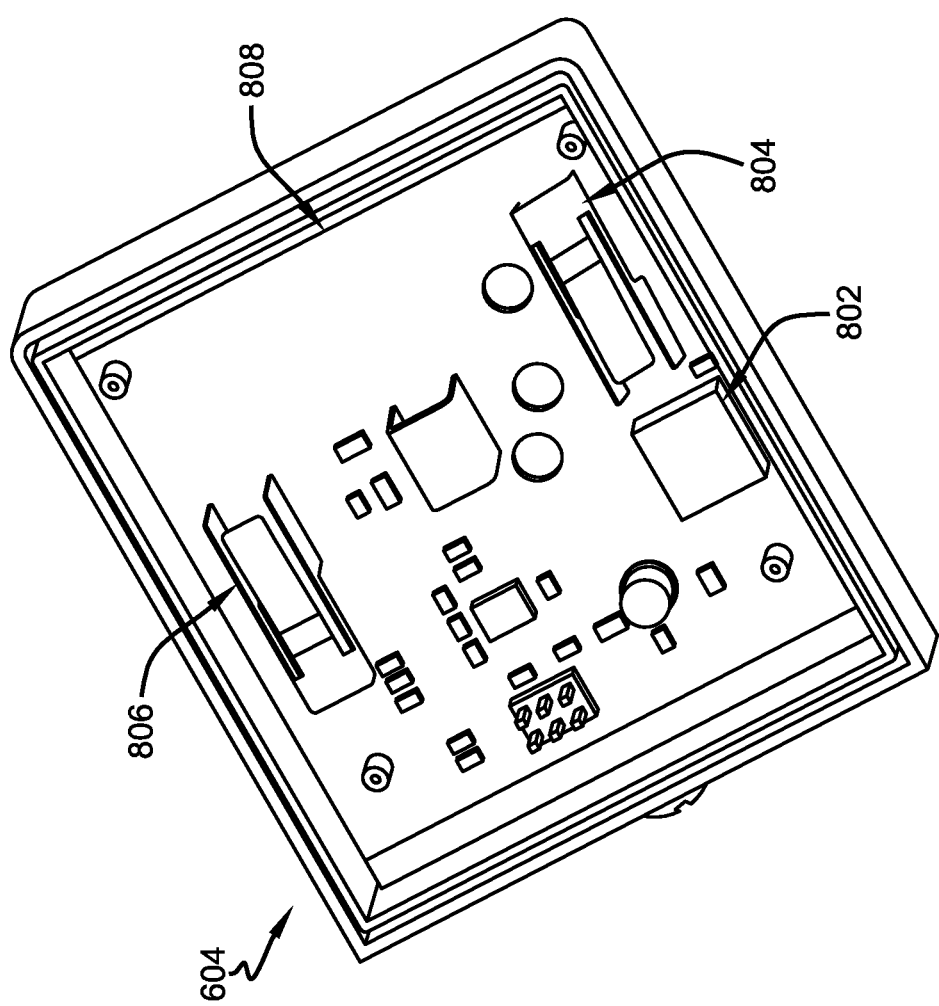
FIG. 8 is a perspective view of another aspect of an exemplary implementation of a component of a device.
Figure 9:
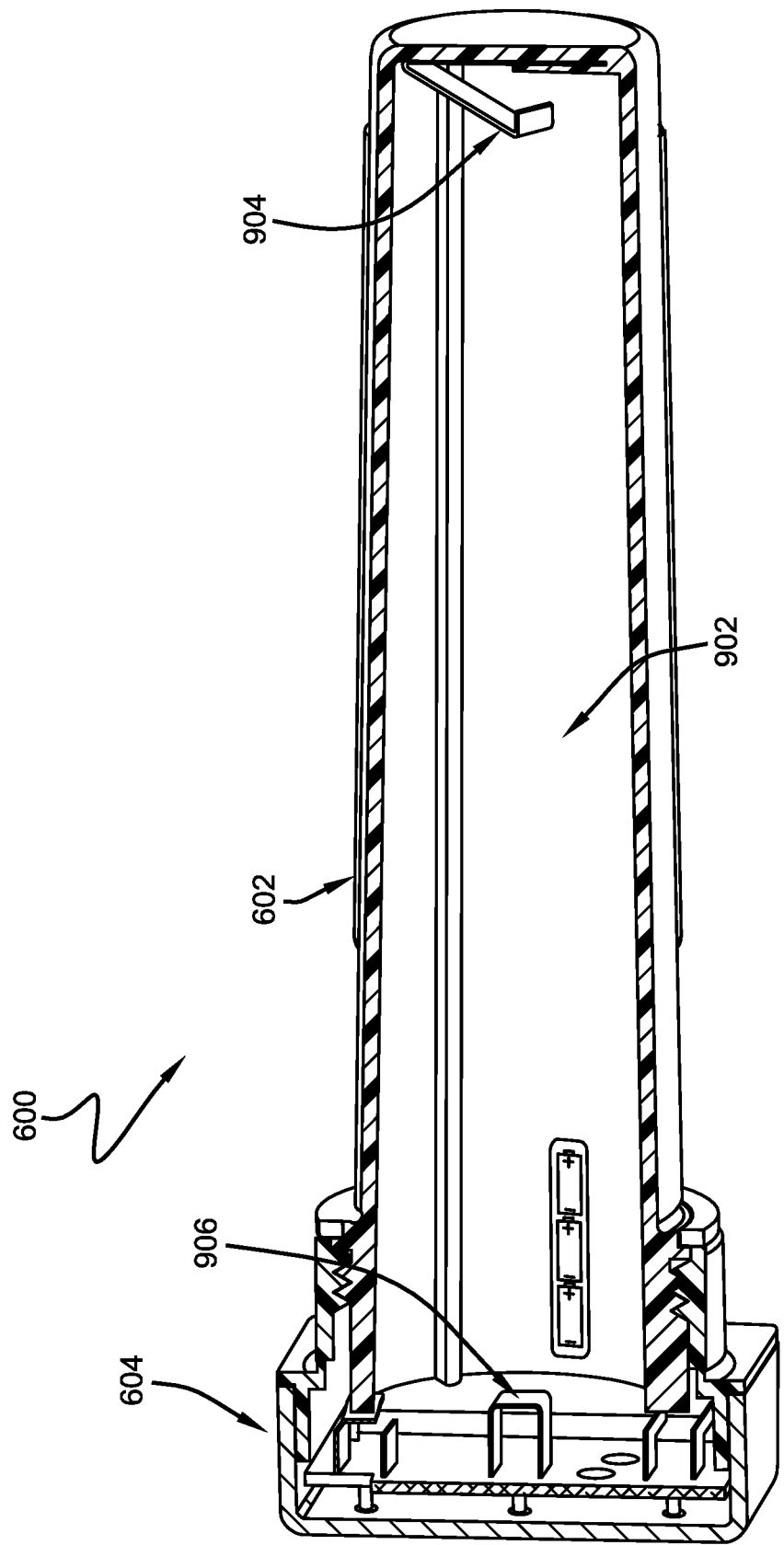
FIG. 9 is a cross sectional view of the implementation shown in FIGS. 6A-6D.

Further, in one implementation, the system can comprise a plurality of other components. For example, the example system can comprise one or more capacitors 104, as in board 100; one or more diodes 306, as in board 300; and one or more transistors 204, 302, as illustrated in boards 200 and 300 respectively. Additionally, the example system can comprise a power cell 202, as in board 200; and a fuse component 304, as in board 300. The example system may also comprise one or more communications ports 500, as shown in FIG. 5.

As illustrated in FIGS. 6A-6D, and 7-9, an example, device 600 can comprise a power pack compartment 602, for example, comprising a battery compartment. The example, system/device 600 can comprise a controller compartment 604, comprising one or more system controller components. Further, the example device/system 600 can comprise one or more communication ports 606, 608, such as for coupling with an apparatus component. In one example, one or more of the communication ports 606, 608 can comprise electrical couplers that electrically couple with lights, switches, and/or other components. In one example, the power pack compartment 602 can comprise an internal chamber 902 that is configured to hold one or more power sources (e.g., batteries). The power pack compartment 602 can also comprise a positive terminal 904 and a negative terminal 906.

In one aspect, an apparatus may comprise more than one component that may be subjected to (e.g., and affected by) electrical noise, such as from a spark igniter. In this aspect, in one implementation, respective components may be coupled to the same or different microprocessors, which are respectively coupled to volatile memory. In this implementation, the microprocessor may store state data for the first component and a second component (e.g., and a third, fourth, etc.) upon detecting a state change of the component. Further, upon reset of the second component (e.g., and others), the corresponding state data can be read from the corresponding volatile memory. Additionally, the read state data for the second component can be compared with known state data (e.g., in non-volatile memory) for the second component; and the second component can be placed into the corresponding state indicated by the matched data.

Figure 10:
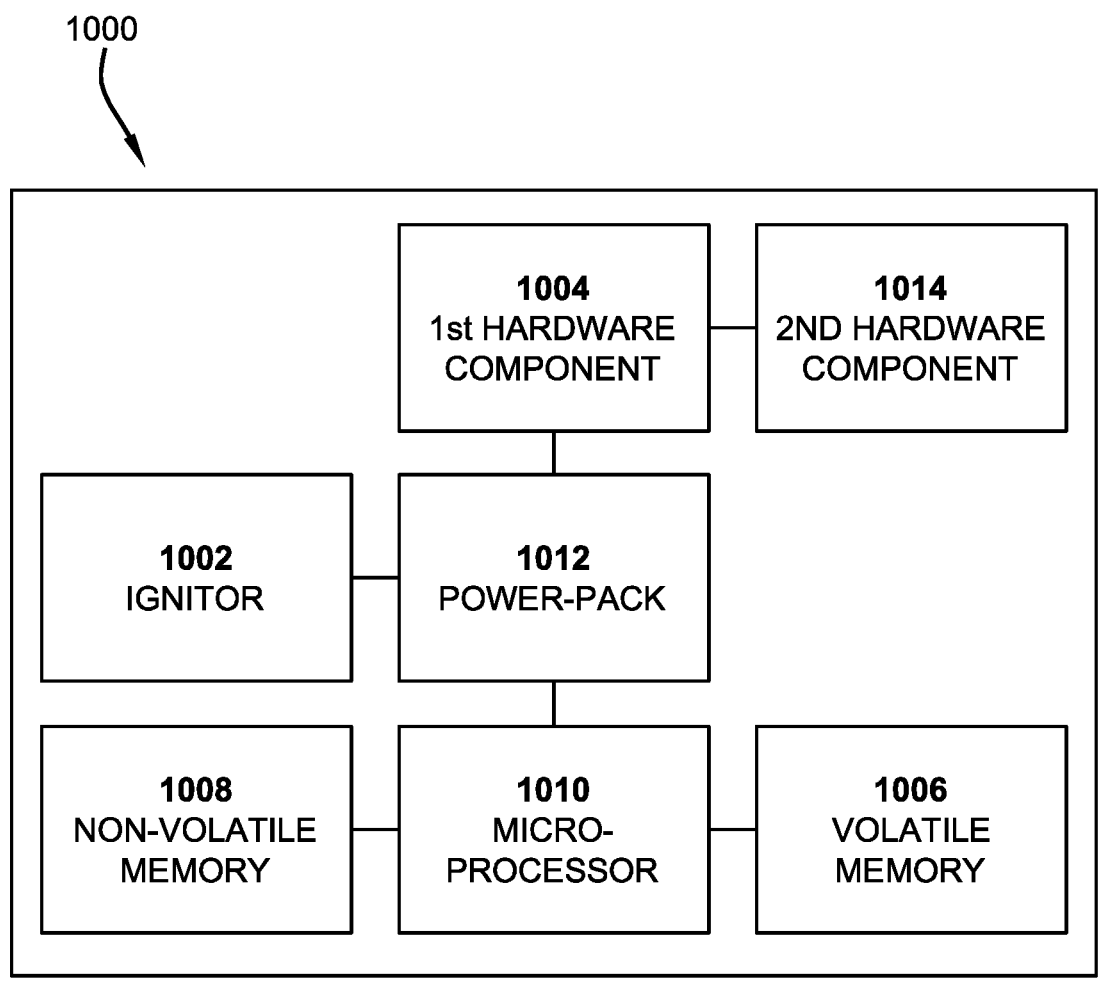
FIG. 10 is a schematic drawing of one exemplary implementation of a device.

FIG. 10 is a schematic diagram illustrating an example implementation of an apparatus 1000 that utilizes one or more portions of one or more systems described herein. In this implementation, the example apparatus 1000 can comprise an igniter 1002. As described above, the igniter 1002 can be configured to provide a spark (e.g., plasma spark) that is used to ignite fuel, such as in a stove, grill, heater, etc. Further, the example, apparatus 1002 can comprise a first hardware component 1004 that is operable in a first state and a second state. In this implementation, the first hardware component 1004 can be subjected to electrical noise generated by the igniter 1002.

The example apparatus 1000 can also comprise volatile memory 1006 that is used to store data indicative of a current state of the first hardware component 1004. Additionally, the example apparatus 1000 can comprise non-volatile memory 1008 that comprises data indicative of the first state and the second state. In this implementation, the example apparatus 1000 comprises a microprocessor 1010 that is communicatively coupled with the volatile memory 1006 and non-volatile memory 1008. The microprocessor 1010 can be operable to store the data indicative of the current state of the first hardware component 1004 in the volatile memory 1006 upon a state change of the first hardware component 1004 between the first state and the second state. Further, the microprocessor 1010 can be operable to compare the stored state data of the first hardware component 1004 in the volatile memory 1006 with the data stored in non-volatile memory 1008 upon a reset of the microprocessor 1010 resulting from electrical noise (e.g., caused by the igniter 1002). The microprocessor 1010 can also be operable to place the first hardware component 1004 in a component state matching the state indicated by the state data read from the volatile memory 1006.

In one implementation, the example apparatus 1000 can comprise a power-pack 1012 that is operably coupled with, and provide power to, the first hardware component 1004 (e.g., amongst other things). The power-pack 1012 may also be operable to provide power to the other components in the apparatus 1000, such as a second hardware component 1014, the microprocessor 1010, the igniter 1002, and/or other components.

In one implementation, the power pack can comprise a pass through mode that supplies substantially constant power to a downstream second hardware component 1014. In this implementation, the non-volatile memory 1008 can be communicatively coupled with the power pack 1012 when it is placed in power-pass through mode. Further, the non-volatile memory 1008 can store state information indicative of the state of the power pack that identifies the state of power pack prior to removal from an electrical power source. As an example, if batteries are removed from the power pack 1012, or the power pack 1012 is un-coupled from a power source, the state of the power pack (e.g., pass through mode or not) can be stored in non-volatile memory 1008. In this example, when power is restored to the power pack (e.g., batteries replaced) the state of the power pack 1012 prior to unpowering, can be identified and restored to the power pack 1012.

In one aspect, a system can comprise a power pack that is operably coupled with (e.g., in electrical communication with), and configured to provide power to, the first component (e.g., and a second, third, etc. component). In this aspect, in one implementation, when the power pack is placed in power-pass through mode it can supply substantially constant power to a downstream second component. That is, for example, the power-pass through mode may comprise a mode in which a switching mechanism is not utilized to change the state of the component between powered and unpowered. Instead, for example, when a power unit (e.g., batteries) is coupled with the power pack, electrical power can be provided to the component(s).

In one implementation, a battery pack configured to receive one or more batteries (e.g., 3 D-cell batteries) can comprise an integrated control module for operating apparatus (e.g., grill) backlighting (e.g., or other components of an apparatus), for example, by toggling a momentary button located on the apparatus. In another implementation, an additional feature can be included to allow for either a backlighting toggle mode, and/or an additional capability of placing the control module into the power pass-through mode, where the backlighting is activated upon powering of the unit. In this implementation, the unit may be switched between the two modes of operation, such that the unit is not permanently placed into either the backlighting toggle mode or power pass-through mode.

In one implementation, in the backlighting toggle mode, the battery pack module can be electrically coupled with (e.g., wired) to a switch (e.g., a momentary switch) via a switch input terminal on the battery pack control module. In this implementation, the lighting system (e.g., LED lighting string) can be wired to power output terminals on the battery pack control module; and, upon placing batteries into the battery holder, for example, and securing the battery holder to the module, the unit can be powered and in the backlighting mode. Further, in this implementation, activating the switch can alternately turn the backlighting "on" and "off."

In another implementation, in power pass-through mode, the battery pack module switch and connections can be replaced with a jumper coupling that is coupled to the switch input terminals of the battery module. In this implementation, the lighting system (e.g., power) output terminals on the control module can be electrically coupled with another compatible downstream component. Further, in this implementation, when the batteries are installed into the battery holder, and attached to the control module, downstream power can be provided. In one implementation, power may be provided downstream after an initial power-up delay (e.g., after a two (2) second delay). In this implementation, power can remain substantially, continuously active to the downstream component(s), at least until the batteries are removed or are depleted to a non-operational level. Additionally, in this implementation, subsequent battery replacement may not alter the operational mode of coupled components, as long as the jumper wire remains attached to the button input terminals.

In this aspect, in one implementation, the battery module can be placed back into switch toggle mode by reversing the steps described above. That is, for example, the battery pack can be removed from the control module; the jumper can be removed from the button input terminals; the switch can be attached to the button input terminals; the lighting system can be attached to the power output terminals; and the battery holder can be attached to the control module. As one example, upon attaching the battery holder to the control module, the unit can now perform as described in the backlighting toggle mode description.

In one implementation, the exemplary system can comprise non-volatile memory that is communicatively coupled with the power pack. In this implementation, when the power pack is placed in power-pass through mode, the non-volatile memory can be used to store state information for the power (e.g., battery) pack. As an example, the state data for the power pack may be indicative of the power pack state prior to removal from an electrical power source. That is, for example, the power pack may be providing power to one or more components prior to removal of batteries from the power pack. Upon detecting a state change, the state of the power pack can be stored in non-volatile memory. In this implementation, when the batteries are removed from the power pack and replaced (e.g., with fresh batteries), the state data can be read from the non-volatile memory, and the power pack can be placed in the state indicated by the stored data (e.g., state prior to power loss).

FIGS. 6-12 are component diagrams illustrating various perspective and cut-away views of one implementation of an example environment where one or more of the techniques and systems, described herein, may be utilized. In this implementation, the example environment can comprise a device that can be used with a gas appliance, such as a gas grill or the like. The example device can comprise a battery compartment (e.g., as shown in FIG. 12), such as a tube configured to receive one or more batteries. Further, the example device may comprise a control module portion, that comprises one or more electrical circuits, microcontroller(s), memory, storage, etc. (e.g., as shown in FIG. 11), that can be used to control one or more systems coupled to the device, such as lighting etc. Additionally, the example device may comprise one or more electrical connectors (e.g., as shown in FIG. 10), which can be used to couple one or more systems, actuators, etc., for use with the example device.

Figure 13:
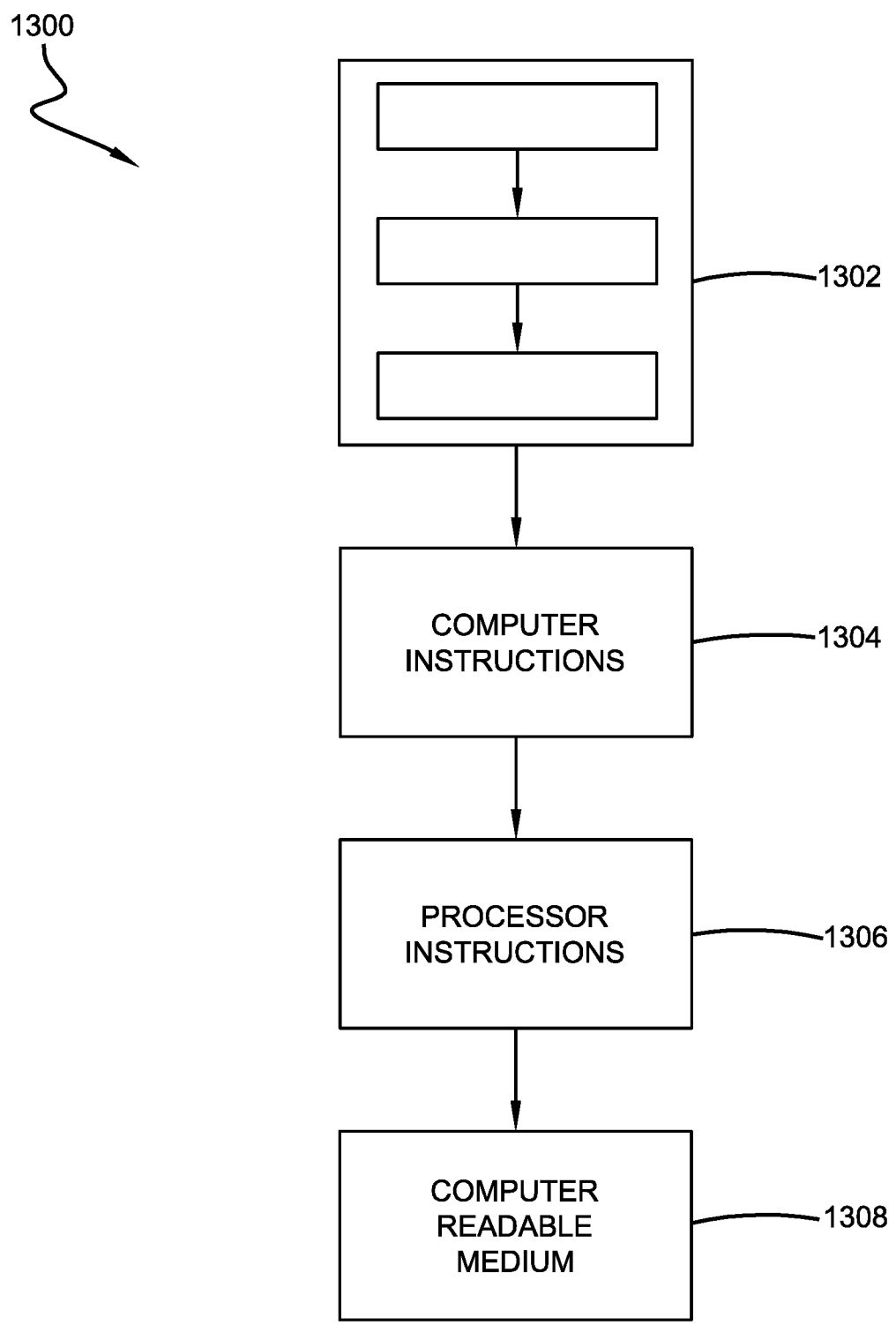
FIG. 13 is an illustration of an exemplary computer-readable medium comprising processor-executable instructions configured to embody one or more of the provisions set forth herein.

In another implementation, a computer-readable medium may comprise processor-executable instructions that can be configured to implement one or more portions of the one or more techniques presented herein. An example computer-readable medium is illustrated in FIG. 13, where the implementation 1300 comprises a computer-readable medium 1308 (e.g., a CD-R, DVD-R, a hard disk drive, flash-drive, solid-state storage, non-volatile memory storage component, and/or other non-transient computer readable medium), on which is encoded computer-readable data 1306. This computer-readable data 1306 in turn comprises a set of computer instructions 1304 (e.g., firmware) that can be configured to operate in accordance with one or more of the techniques set forth herein. In one such implementation 1302, the processor-executable instructions 1304 may be configured to perform a method, such as at least some of the exemplary methods described herein. In another such implementation, the processor-executable instructions 1304 may be configured to implement a system, such as at least some of the exemplary system illustrated in FIGS. 1-12. Many such computer-readable media may be devised by those of ordinary skill in the art that are configured to operate in accordance with the techniques presented herein.

Figure 14:
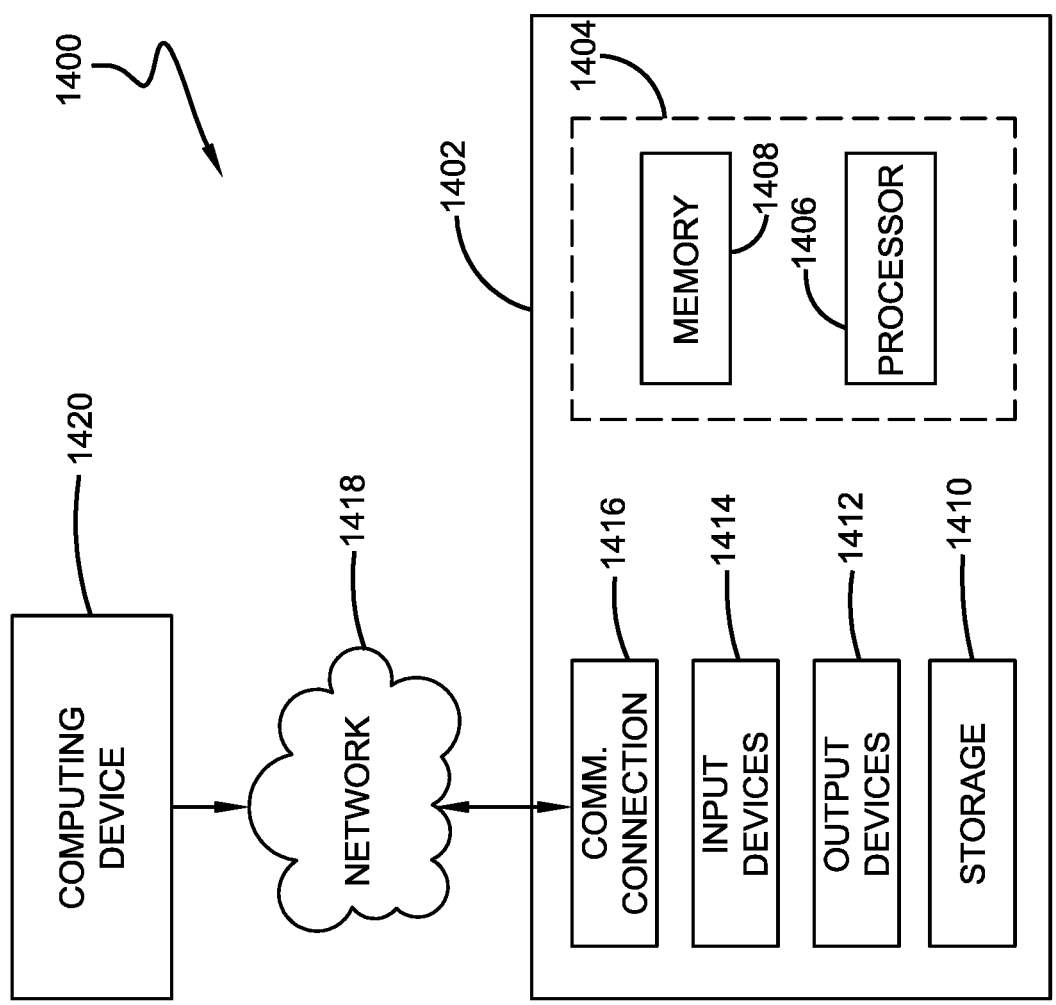
FIG. 14 illustrates an exemplary computing environment wherein one or more of the provisions set forth herein may be implemented.

FIG. 14 and the following discussion provide a brief, general description of a computing environment in/on which one or more of the implementations of one or more of the methods and/or system set forth herein may be implemented. The operating environment of FIG. 14 is merely an example of a suitable operating environment and is not intended to suggest any limitation as to the scope of use or functionality of the operating environment. Example computing devices include, but are not limited to, circuit boards with microprocessors, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 1400 comprising a computing device 1402 configured to implement one or more implementations provided herein. In one configuration, computing device 1402 includes at least one processing unit 1406 and memory 1408. Depending on the exact configuration and type of computing device, memory 1408 may be volatile (such as RAM, for example), non-volatile (such as ROM, EEPROM, solid state drive, flash memory, etc., for example) or some combination of the two. This configuration is illustrated in FIG. 14 by dashed line 1404.

In other implementations, device 1402 may include additional features and/or functionality. For example, device 1402 may also include additional storage (e.g., removable and/or non-removable) including, but not limited to, magnetic storage, optical storage, solid state drive, and the like. Such additional storage is illustrated in FIG. 14 by storage 1410. In one implementation, computer readable instructions to implement one or more implementations provided herein may be in storage 1410. Storage 1410 may also store other computer readable instructions to implement an operating system, an application program and the like. Computer readable instructions may be loaded in memory 1408 for execution by processing unit 1406, for example.

The term "computer readable media" as used herein includes computer storage media. Computer storage media includes volatile and nonvolatile, removable and non-removable media implemented in any method or technology for storage of information such as computer readable instructions or other data. Memory 1408 and storage 1410 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1402. Any such computer storage media may be part of device 1402.

Device 1402 may also include communication connection(s) 1416 that allows device 1402 to communicate with other devices. Communication connection(s) 1416 may include, but is not limited to, a modem, a Network Interface Card (NIC), an integrated network interface, a radio frequency transmitter/receiver, an infrared port, Bluetooth, a USB connection or other interfaces for connecting computing device 1402 to other computing devices. Communication connection(s) 1416 may include a wired connection or a wireless connection. Communication connection(s) 1416 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1402 may include input device(s) 1414 such as keyboard, mouse, pen, voice input device, touch input device, infrared cameras, video input devices, and/or any other input device. Output device(s) 1412 such as one or more displays, speakers, printers, and/or any other output device may also be included in device 1402. Input device(s) 1414 and output device(s) 1412 may be connected to device 1402 via a wired connection, wireless connection, or any combination thereof. In one implementation, an input device or an output device from another computing device may be used as input device(s) 1414 or output device(s) 1412 for computing device 1402.

Components of computing device 1402 may be connected by various interconnects, such as a bus. Such interconnects may include a Peripheral Component Interconnect (PCI), such as PCI Express, a Universal Serial Bus (USB), firewire (IEEE 1394), HDMI, an optical bus structure, a wireless bus structure, and the like. In another implementation, components of computing device 1402 may be interconnected by a network. For example, memory 1408 may be comprised of multiple physical memory units located in different physical locations interconnected by a network.

Those skilled in the art will realize that storage devices utilized to store computer readable instructions may be distributed across a network. For example, a computing device 1420 accessible via network 1418 may store computer readable instructions to implement one or more implementations provided herein. Computing device 1402 may access computing device 1420 and download a part or all of the computer readable instructions for execution. Alternatively, computing device 1402 may download pieces of the computer readable instructions, as needed (e.g., locally or remotely), or some instructions may be executed at computing device 1402 and some at computing device 1420.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method for mitigating the effect of electrical noise on a hardware component, comprising:
   storing state data indicative of a current state of a first hardware component subject to electrical noise in volatile memory upon a state change of the first hardware component;
   reading the stored state data of the first hardware component from the volatile memory upon reset of a microprocessor controlling at least a portion of the operation of the first hardware component, the reset resulting from electrical noise; and
   placing the first hardware component in a component state that is indicated by the state data read from the volatile memory; and
   providing power to the first hardware component using and operably coupled power pack, wherein non-volatile memory is communicatively coupled with the power pack, when placed in power-pass through mode, and the non-volatile memory stores state information for the power pack indicative of the power pack state prior to removal from an electrical power source.

2. The method of claim 1, the electrical noise caused by a spark generated by an igniter.

3. The method of claim 1, the current state comprising one of: a powered state, and a non-powered state.

4. The method of claim 1, storing the state data indicative of the current state of the first hardware component comprising storing more than one different value into the volatile memory, respective different values indicative of the current state of the first hardware component.

5. The method of claim 4, reading the stored state data indicative of the state of the first hardware component comprising reading respective different stored values from the volatile memory.

6. The method of claim 5, comprising checking the respective read values to identify the state of the first hardware component against known values stored in non-volatile memory using firmware stored in the non-volatile memory coupled with the microprocessor.

7. The method of claim 6, checking the respective read values comprising matching respective read values with known state values, else, defaulting the state of the first hardware component to an unpowered state.

8. The method of claim 1, comprising defaulting the state of the first hardware component to an unpowered state upon degradation of the volatile memory due to loss of power below a power threshold level.

9. A system for mitigating the effect of electrical noise on a hardware component in an apparatus, comprising:
  volatile memory storing data indicative of a current state of a first hardware component subject to electrical noise;
  a microprocessor communicatively coupled with the volatile memory to control at least a portion of the operation of the first hardware component, the microprocessor operably:
    instructing the storage of the data indicative of the current state of the first hardware component in the volatile memory upon a state change of the first hardware component;
    reading the stored state data of the first hardware component from the volatile memory upon a reset of the microprocessor resulting from electrical noise; and
    instructing the placement of the first hardware component in a component state matching the state indicated by the state data read from the volatile memory;
  a power pack operably coupled with, and to provide power to, the first hardware component, and
  non-volatile memory communicatively coupled with the power pack, when placed in power-pass through mode, the non-volatile memory storing state information for the power pack indicative of the power pack state prior to removal from an electrical power source.

10. The system of claim 9, the data indicative of the current state of the first hardware component in the volatile memory comprising more than one different value, respectively comprising an indication of the same current state of the first hardware component.

11. The system of claim 9, comprising non-volatile memory communicatively coupled with the microprocessor, the non-volatile memory comprising firmware to perform the matching of the respective read values to identify the state of the first component.

12. The system of claim 9, the power pack, when placed in power-pass through mode, supplying substantially constant power to a downstream second component.

13. An apparatus, comprising:
  an igniter that generates a spark to ignite fuel;
  a first hardware component operable in a first state and a second state, the first hardware component subjected to electrical noise generated by the igniter;
  volatile memory storing data indicative of a current state of the first hardware component;
  non-volatile memory comprising data indicative of the first state and the second state;
  a microprocessor communicatively coupled with the volatile memory and non-volatile memory, the microprocessor operably:
    storing the data indicative of the current state of the first hardware component in the volatile memory upon a state change of the first hardware component between the first state and the second state;
    comparing the stored state data of the first hardware component in the volatile memory with the data stored in non-volatile memory upon a reset of the microprocessor resulting from electrical noise; and
    placing the first hardware component in a component state matching the state indicated by the state data read from the volatile memory; and
  a power pack operably coupled with, and to provide power to, the first hardware component, the power pack comprising a pass through mode that supplies substantially constant power to a downstream second hardware component, and the non-volatile memory communicatively coupled with the power pack when placed in power-pass through mode, the non-volatile memory storing state information for the power pack indicative of the power pack state prior to removal from an electrical power source.

14. The apparatus of claim 13, the first state comprising a powered state, and the second state comprising a non-powered state.

15. The apparatus of claim 13, the microprocessor operably storing the state data indicative of the current state of the first hardware component comprising the microprocessor operably storing more than one different value into the volatile memory, respective different values indicative of the current state of the first hardware component.

16. The apparatus of claim 13, the first hardware component comprising a lighting system.

* * * * *